Aug. 28, 1973

J. E. NABER 3,755,535

PROCESS FOR THE REMOVAL OF SULFUR TRIOXIDE FROM
INDUSTRIAL OFF-GASES

Filed Sept. 16, 1971

INVENTOR:
JAAP E. NABER
BY: *Leonard P. Miller*
HIS AGENT

United States Patent Office 3,755,535
Patented Aug. 28, 1973

3,755,535
PROCESS FOR THE REMOVAL OF SULFUR
TRIOXIDE FROM INDUSTRIAL OFF-GASES
Jaap E. Naber, Amsterdam, Netherlands, assignor to
Shell Oil Company, New York, N.Y.
Filed Sept. 16, 1971, Ser. No. 180,959
Int. Cl. B01j 11/00; C01b 17/02, 17/68
U.S. Cl. 423—244
15 Claims

ABSTRACT OF THE DISCLOSURE

A process for removing sulfur trioxide from industrial off-gases containing sulfur oxides by contacting the gases at an elevated temperature with a solid acceptor comprising an inorganic oxide which is substantially free of deposited metals or metal compounds, and regenerating the loaded acceptor with a hydrogen sulfide-containing gas. Optionally, the sulfur compounds in the off-gases may first be oxidized to sulfur trioxide prior to contacting with the solid acceptor.

BACKGROUND OF THE INVENTION

The invention relates to a process for the removal of sulfur trioxide from industrial off-gases which contain sulfur oxides, using a solid acceptor.

Industrial off-gases which contain sulfur oxides include the waste gases of numerous industrial plants, such as off-gases from ore-roasting furnaces, and from ore-smelting plants, flue gases from chemical plants and refineries, off-gases from sulfuric acid plants and plants in which hydrogen sulfide is converted into elemental sulfur by partial combustion with oxygen or an oxygen-containing gas by a process known as the Claus process. Such industrial off-gases all contain sulfur oxides to a greater or lesser extent and may in addition contain finely divided solids, such as soot and metal oxides, which are referred to as fly ash. Depending on their origin, industrial off-gases will mainly contain sulfur dioxide or sulfur trioxide as the sulfur oxide.

In connection with the problem of air pollution, it is undesirable for industrial off-gases containing sulfur oxides to be freely discharged into the atmosphere. Various processes for treating sulfur oxide containing off-gases have been proposed in the literature. Some of these processes are already being tested on a pilot plant scale. However, the majority of these processes are directed to the removal of sulfur dioxide from waste gases and are ineffective, or substantially less effective, in removing sulfur trioxides. In fact in some processes, particularly the so-called "wet adsorption" processes, the presence of minor quantities of sulfur trioxide in the off-gases causes considerable problems and hence such processes are not suitable for treating $SO_3$-containing gases.

The development of "dry adsorption" processes based on the use of solid acceptors has for the most part been directed to the removal of sulfur dioxide from off-gases. In a typical process of this type, off-gases containing sulfur dioxide and oxygen are contacted with a solid acceptor comprising a metal or metal oxide dispersed or deposited on a carrier material such as alumina. The metal or metal oxide reacts with $SO_2$ in the presence of oxygen to form a metal sulfate. The loaded acceptors are subsequently contacted with a reducing gas such as hydrogen or light hydrocarbons whereby the sulfate is decomposed with the concomitant release of $SO_2$.

While relatively effective for $SO_2$ and $SO_3$ removal, processes employing metal or metal oxide-containing acceptors suffer from the disadvantage of being relatively expensive both because of cost of the metals of metal oxide applied on the carrier material and the cost of the hydrogen or hydrocarbon reducing gas employed for regeneration. The present process provides an efficient and highly economical method for removing sulfur trioxide from industrial off-gases and for regenerating the solid acceptors employed for this purpose.

THE INVENTION

It has now been found that sulfur trioxide can be effectively removed from industrial waste gases containing sulfur oxides by contacting the off-gases at an elevated temperature with a solid acceptor comprising an inorganic oxide which is substantially free of deposited metals or metal compounds, and that after being loaded with sulfur trioxide, the solid acceptor can be regenerated at temperatures in substantially the same range as the acceptance temperature by contacting the loaded acceptor with hydrogen sulfide or with a gas that contains hydrogen sulfide. After regeneration the acceptor is again contacted with the sulfur trioxide-containing off-gases.

The process according to the invention can suitably be used for the removal of sulfur trioxide from off-gases originating from plants which produce or process sulfuric acid. When such gases are discharged into the atmosphere, condensation may cause the formation of a mist which is visible as a white plume. Such a mist is very persistent and difficult to control, and besides being corrosive by nature, it is also injurious to health. The process according to the invention can be employed to prevent the formation of this plume by accepting the last quantities of sulfur trioxide from the discharged gases.

The present process is also suitable for the treatment of industrial off-gases which contain sulfur dioxide. In this embodiment of the invention, off-gases are first treated with an oxygen-containing gas or gas mixture, such as air, in the presence of an oxidation catalyst whereby substantially all of the sulfur compounds are oxidized to sulfur trioxide. The sulfur trioxide is then removed in accordance with the procedure set out above.

The solid acceptor employed in the present process consists wholly or substantially of an inorganic oxide which is capable of binding sulfur trioxide and of being regenerated by means of hydrogen sulfide or a gas which contains hydrogen sulfide. A particularly suitable solid acceptor for this purpose is activated alumina, such as eta, alpha or gamma alumina. Other suitable acceptors are magnesia or alumina, or magnesia impregnated on an inert carrier of, for example, silica-alumina. Mixtures of two or more of the said acceptors may likewise be used.

The solid acceptors which are used according to the process of the invention for the acceptance of the sulfur trioxide from industrial off-gases are free or substantially free of metals and/or metal compounds which are usually deposited on solid acceptors employed in conventional processes. However, the acceptors used need not be entirely pure. Other metal compounds may be present in the acceptor as impurities, for example, commercial aluminas generally contain silica, ferric oxide and titanium dioxide in quantities of less than 0.1% by weight, while sodium oxide is present in a quantity of less than 1% by weight.

According to the invention, the solid acceptor loaded with sulfur trioxide is regenerated with hydrogen sulfide or gases which contain hydrogen sulfide. Suitable hydrogen sulfide-containing gases are those which contain 10% by volume or more, and preferably more than 25% by volume, of hydrogen sulfide. Such gases are available in large quantities at refineries.

The acceptance step in the process according to the invention may be carried out over a wide temperature range. To prevent condensation of $SO_3$ and consequent formation of a white plume, the temperature should at any rate be above 180° C. A very suitable temperature range is of from 250° C. to 625° C. This temperature range also covers the final temperatures of many industrial off-gases, such as flue gases, when they are discharged to the stack. This is an advantage as will be clear to any person skilled in the art, since such gases will then lose little of their buoyancy while passing through the process according to the invention. It is preferred to use acceptance temperatures between 330° C. and 450° C.

The subsequent regeneration of the loaded solid acceptor is preferably carried out at the same temperature as the preceding acceptance. Although this is by no means strictly necessary, the regeneration temperature usually differs by not more than 50° C. from the acceptance temperature to insure simplicity of the mode of operation. In general, the regeneration temperature will be between 200° C. and 550° C., and more preferably between 280° C. and 475° C.

The gas hourly space velocities (GHSV) used during acceptance are between 100 and 30,000 Nl. of gas per liter of acceptor per hour, the GHSV's used during the regeneration being between 5 and 3,000 Nl. of gas per liter of acceptor per hour.

As stated above, the process according to the invention may also be used for $SO_2$-containing off-gases. In this embodiment of the invention, the sulfur compounds in these gases are first oxidized to sulfur trioxide with oxygen or an oxygen-containing gas in the presence of an oxidation catalyst, and that the sulfur trioxide is subsequently removed from the said off-gases by acceptance on a solid acceptor.

Oxidation catalysts suitable for this purpose are elaborately described in the literature and are well-known in the art. One example of a very suitable catalyst of this type consists of a vanadium compound and a potassium compound deposited on a solid carrier such as silica.

The oxidation of the sulfur compounds, such as sulfur dioxide, in the said off-gases is preferably carried out in the same temperature range as used for acceptance. This has the advantage that industrial off-gases, such as, for example, flue gases, are successively oxidized and freed from sulfur trioxide without the heat economy being adversely influenced thereby, so that these off-gases, after they have or have not been subjected to additional heat withdrawal, can subsequently be carried off directly to the stack. Suitable oxygen-containing gases include air or air enriched with oxygen.

Industrial off-gases, such as flue gases, generally contain relatively large amounts of solid matter such as ash and soot. To prevent the fixed beds of oxidation catalyst and/or acceptor from becoming clogged after short periods, the oxidation and acceptance steps for such solids-containing gases are preferably carried out in an apparatus of a special design. A preferred apparatus for this purpose contains substantially parallel gas channels bounded by permeable walls behind which the acceptor or the oxidation catalyst is present and freely accessible to the gas and its constituent components, but not to solid particles such as soot and fly ash. As a result, the gas channels are not, or are much less rapidly, clogged by the solid particles present. Consequently, apparatuses of this type can remain in operation for much longer periods of time. For the oxidation step, one such apparatus will as a rule be sufficient whereas for acceptance purposes it is preferred to use two of such apparatuses to permit a switch-over when the solid acceptor in the first apparatus has to be regenerated.

The oxidation catalyst and/or the solid acceptor may be used in any form. They may be used, for example, as shaped particles with a size between 0.1 and 10 mm., for instance of 0.5 to 5 mm., or as shaped plates of larger sizes, for example, 10 x 10 cm. or more with a thickness of 0.5 to 5 cm. In the latter case the industrial off-gases may also suitably be treated in an apparatus in which the substantially parallel gas channels are formed and bounded by the plate-shaped oxidation catalyst or acceptor itself. If desired, the shaped plates may, however, also be arranged between gas-permeable walls, for instance, wire gauze.

It will be clear to those skilled in the art that the above said apparatuses may also be used in combination. For example, the apparatus having substantially parallel gas channels bounded by permeable walls for the oxidation catalyst, which in this case is used in the form of shaped particles, may be used in combination with the apparatus in which the substantially parallel gas channels are formed and bounded by the plate-shaped acceptor itself for the solid acceptor.

Mechanically strong acceptor plates, which can be used for a long time without being subject to cracking and disintegration, can be made as follows.

The oxidic acceptor material must previously be freed from water by heating to a temperature above which there will be no, or substantially no, shrinkage. For alumina this is a temperature above 780° C. Preferably the acceptor material is calcined between 800° C. and 1100° C. The calcined acceptor material is subsequently mixed with a binding agent, with the optional addition of water, and the mixture of acceptor material and binding agent is compressed under pressure to plates of desired dimensions. The shaped acceptor plates are subsequently heated at temperatures above 780° C., preferably in the range of from 800° C. to 1300° C., if desired, after previous drying at temperatures up to 200° C. After cooling, the acceptor plates are ready for use as described above.

Suitable binding agents used are clays such as kaolinite, attapulgite, bentonite, halloysite and montmorillonite. Kaolinite or kaolin is preferred since it can be readily purified and reduced to a convenient particle size for mixing.

The quantity of binding agent to be used depends to some extent on the type of binding agent and acceptor material used but can readily be determined in each individual case by means of a trial parcel of acceptor plates. In the case of clay and alumina, it is preferred to use 0.1 to 0.5 part by weight of clay to 1 part by weight of alumina.

In order to obtain acceptor plates of extra mechanical strength, part of the binding agent used may be replaced by glass in a finely divided form such as glass powder or glass frits. Preferably the amount of clay binding agent replaced by the finely divided glass or glass frits is such that the acceptor plates contain less than 10% by weight, and more preferably 2-6% by weight of glass (based on dry matter). Suitable types of glass are soda-lime glass, lead glass, boron silicate glass and the like.

The acceptor plates prepared by the process described above are already slightly porous. However, in order to increase their porosity, it is preferred to add a pore-forming agent to the mixture of calcined acceptor material and binding agent. As pore-forming agent use may be made of combustible materials such as flour, wood chips, synthetic or natural resins, paraffin wax, sugar or gas-forming salts such as persalts or peroxides. Preferably use is made of a pore-forming agent which decomposes entirely into one or more gaseous compounds so that no impurities remain in the finished acceptor. Polypivalolactone, and in particular polypropylene, are suitable for this application. The pore-forming agents may be used in a quantity of from 1 to 25% by weight, and more preferably of from 5 to 15% by weight, based on the combined acceptor material and binding agent.

Although the process has been described with special reference to an acceptor in the form of plates, it is to be understood that the described process for obtaining mechanically strong acceptors may be used for the manufacture of other shaped acceptors such as extrudates, tablets, pills, spheres and the like.

For the removal of sulfur compounds from industrial off-gases which do not contain solid dust particles, fixed beds of oxidation catalyst and/or solid acceptor may be used. Compared with the apparatuses discussed above, a fixed bed offers disadvantages in that the reactor is smaller and of simpler construction and that it is possible for the acceptor to be loaded to a higher level with sulfur trioxide. These advantages usually outweigh the drawbacks of a higher pressure drop across the fixed bed and a risk of a more pronounced disintegration of the acceptor particles. Fixed beds may be used in the processing of, for example, the off-gases or tail gases of the Claus process. Such gases, which contain approximately 1% by volume of hydrogen sulfide and 0.5% by volume of sulfur dioxide, may suitably be freed from the said sulfur compounds by the process according to the invention by first oxidizing them to sulfur trioxide, as previously described and subsequently accepting the sulfur trioxide formed on the solid acceptor.

In general the discharge of flue gases as well as Claus off-gases is a problem in an oil refinery. In this case it may be preferable to process the two gases together in an apparatus which is provided with substantially parallel gas channels, as described, in which the combined off-gases are first oxidized and subsequently freed from sulfur trioxide. Alternatively, the off-gases from sulfuric-acid processing or producing plants may be passed into the combined off-gases after the oxidation step, but prior to the aceeptance step.

DESCRIPTION OF THE DRAWINGS

In FIG. 1, reference numeral 1 designates open gas channels which run parallel and are separated from each other by catalyst chambers 2 filled with catalyst particles 3. The gas channels are provided with a gas-permeable wall in the form of fine-meshed gauze 4. The gas channels and catalyst chambers are formed by means of frames 10, to which the gauze is secured, which frames are composed to form an assembly by means of distance pieces 7a, b, c and d. The whole assembly is kept together by means of one or more spindles 8, provided with a nut 9. The catalyst chambers are left open at the top side to permit filling with catalyst. The gas chambers are closed at the top, as well as at the bottom side by means of distance pieces 7a, b and d extending in the longitudinal direction of the frame. The catalyst chambers are closed at the bottom side by distance pieces 7c extending in a longitudinal direction. The total assembly is arranged within flue gas channel 5 which may contain more of such assemblies. In the case shown, the flue gas channel consists of a fixed piece 5a and a detachable piece 5b to permit the placement or replacement as the case may be of one or more assemblies as described.

FIG. 2 shows a side elevation of frame 10. Gauze 4, which may suitably be welded to the frame, is kept in position and prevented from buckling by means of horizontally disposed bars 6b and vertically disposed bars 6a.

FIG. 3 shows an apparatus for the acceptance of $SO_3$, the acceptor used being in the form of shaped plates. The assembly of acceptor plates 12 is likewise placed in the flue gas channel 5. Reference numerals 13 and 14 designate the gas inlet and gas outlet, respectively, which are interconnected by means of the gas channels 18 bounded by the acceptor plates 12. The plate assembly is kept in place and supported by supporting elements 15 and distance pieces 16. The acceptor plates 12 are supported one on top of the other or separated by a small interspace 17. The plates consist of gamma-$Al_2O_3$ tiles of 20 x 20 x 0.5 cm.

FIG. 4 is a cross-sectional view of FIG. 3 taken along line 4—4. In the figuure, the wall 5 is interrupted to indicate that although FIG. 3 shows an assembly of 5 acceptor plates relative to the width of the flue gas channel, the total number of plates in a flue gas channel or the like will actually be determined by the total width thereof, the thickness of the tiles used and the width of the gas channels bounded by these tiles.

FIG. 5 shows a furnace equipped with a flue gas purification unit in accordance with the invention. In this figure, flue gas after leaving convection bank 22 of furnace 20, is first passed through a flue gas purification unit consisting of oxidation apparatus 24 (e.g., the apparatus shown in FIGS. 1 and 2), and is then passed through acceptance apparatus 25 (e.g., the apparatus shown in FIGS. 3 and 4), which apparatuses are both incorporated in flue gas channel 23 leading to stack 26.

Example 1

Figure 1:
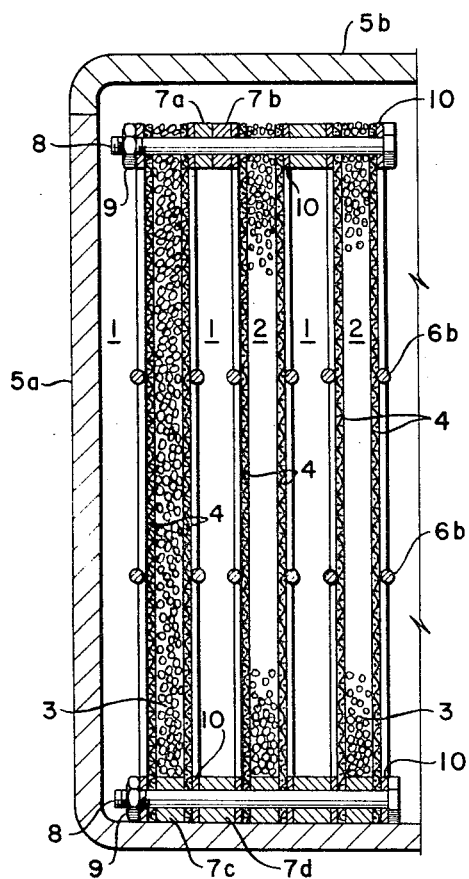
FIG. 1 is a cross section of an apparatus for the oxidation of sulfur dioxide to sulfur trioxide taken along line 1—1 of FIG. 2.

This example demonstrates that a solid acceptor of the type as described in this application acquires a higher load of sulfur oxide under identical test conditions than an acceptor described in the literature and consisting of a copper compound on a solid carrier.

The starting material for the preparation of a gas which contains sulfur trioxide was a gas mixture consisting of 1.4% by volume of sulfur dioxide in air. This gas mixture was passed through a fixed bed of an oxidation catalyst at a GHSV of 500 Nl. of gas per liter of catalyst per hour. The oxidation catalyst consisted of a silica carrier to which was applied 7% by weight of $V_2O_5$ and 8% by weight of $K_2O$ (based on the carrier). This catalyst was used in the form of particles with a size between 1 and 3 mm. The temperature in the bed was 425° C. Analysis of the gas mixture leaving the catalyst bed showed that the conversion to sulfur trioxide was substantially quantitative.

The sulfur-trioxide containing gas formed above was diluted with nitrogen until the diluted gas had the desired sulfur trioxide concentration in parts by volume per million (p.p.m.v.). This gas was passed through a test set-up containing a cylindrical tube made of wire gauze (0.5 mm. mesh) and lined with gamma-$Al_2O_3$ as acceptor. The alumina had a particle size of 0.5 to 1 mm. and had been applied in a layer thickness of 2 mm. over the entire length of this tube. The cylindrical tube had a length of 150 cm. and an internal diameter of 10 mm.

A series of tests were carried out at varying sulfur trioxide contents and varying acceptance temperatures. After each series of tests the loaded alumina was regenerated by means of hydrogen sulfide (100%), after which the regenerated alumina was loaded again. Regeneration took place at different temperatures.

The comparative tests with a known Cu/$Al_2O_3$ acceptor for sulfur dioxide was likewise carried out in the test set-up described above. For this test the cylindrical tube was lined with a 2 mm. layer of the Cu/$Al_2O_3$ acceptor used as particles of 0.5 to 1 mm. The composition of this known acceptors was 9 parts by weight of Cu per 100 parts by weight of gamma-$Al_2O_3$. In the latter case regeneration took place with a nitrogen-hydrogen gas mixture of 50% by volume of $H_2$.

The process conditions of the various test series are listed in Table I below. The results obtained are shown in Table II. In order to permit comparison of these results with those of the comparative test, the loads of the acceptor according to the invention are calculated as percent by weight of $SO_2$ on fresh or regenerated acceptor as the case may be. The values shown in Table II are obtained by determining after each test the total amount of sulfur trioxide or sulfur dioxide as the case may be which had left the tube as well as the relevant loading of the acceptor at that amount of sulfur oxide.

TABLE I

| Process conditions | Experiment number | | | | | Comparative test |
|---|---|---|---|---|---|---|
| | 1 | 2 | 3 | 4 | 5 | |
| GHSV of sulfur-oxide-containing gas, Nl./l./h | 8,800 | 8,800 | 8,800 | 8,800 | 8,800 | 8,800 |
| Acceptance temperature, °C | 425 | 250 | 250 | 500 | 425 | 425 |
| $SO_3$-concentration, p.p.m.v | 2,200 | 2,700 | 1,800 | 1,800 | 150 | 0.14% v. $SO_2$ |
| Regeneration gas | $H_2S$ | $H_2S$ | $H_2S$ | $H_2S$ | $H_2S$ | $H_2/N_2$ (50–50%) |
| GHSV of regeneration gas, Nl./l./hr | 250 | 250 | 250 | 250 | 250 | 330 |
| Regeneration temperature, °C | 425 | 250 | 250 | 500 | 425 | 425 |

TABLE II

| | Acceptor loading, calculated as $SO_2$, percent by weight | Cumulative slip, calculated as percent by weight on input ($SO_3$ or $SO_2$) |
|---|---|---|
| Experiment Number: | | |
| 1 | 0.1 | 21 |
| | 0.8 | 22 |
| | 2.0 | 25 |
| | 5.8 | 35 |
| 2 | 5.8 | 40 |
| | 9.5 | 40 |
| 3 | 7.7 | 26 |
| | 11 | 31.5 |
| 4 | 9 | 43 |
| 5 | 1.4 | 16 |
| Comparative test | 0 | 43 |
| | 1.3 | 45 |
| | 2.0 | 46 |
| | 3.0 | 47 |

The tabulated results clearly show that an essentially metal-free acceptor, such as gamma-$Al_2O_3$, acquires a higher $SO_3$ loading than a metal-containing acceptor, such as $Cu/Al_2O_3$, for $SO_2$. With regard to the effectiveness of the sulfur-oxide removal from off-gases, the experiments described do not permit of any conclusion since the tube length used is too short. The effect of using apparatuses with a height or gas channel length of at least 6 m. is that the sulfur oxides are removed quantitatively. However, it can be deduced from the values obtained in Experiments Nos. 1 to 4 that the regeneration of the loaded acceptors must have been practically 100% since with incomplete regeneration, the cumulative slip at the same or about the same loading would have shown considerable differences.

Example 2

Figure 2:
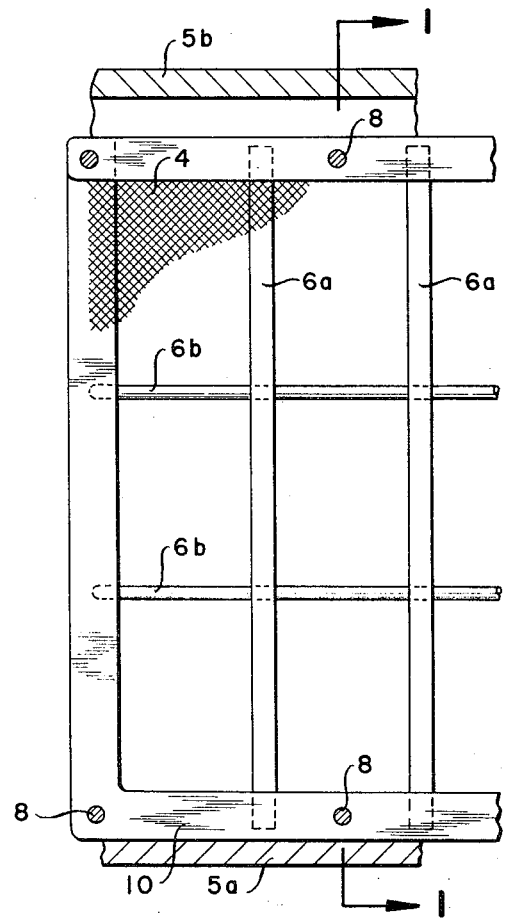
FIG. 2 shows a side elevation of one frame of the oxidation apparatus.
Figure 5:
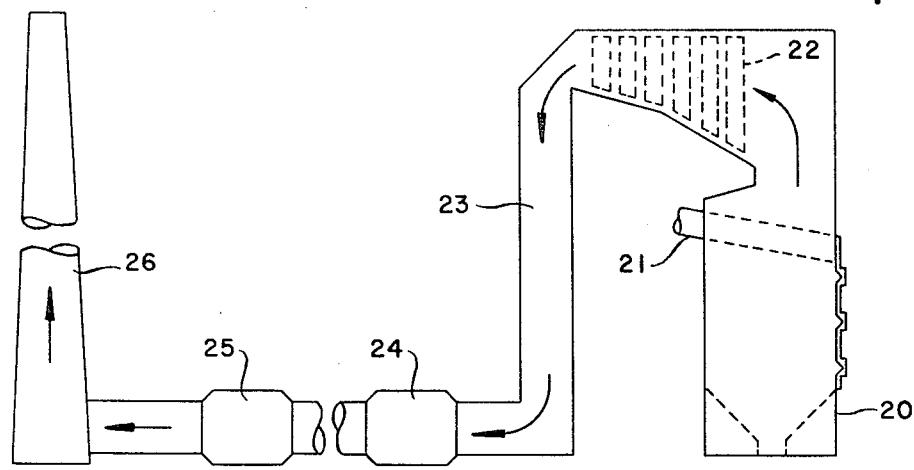
FIG. 5 shows a furnace and stack equipped with a flue gas purification unit comprising an oxidation and acceptance apparatus as shown in the aforementioned figures.
Figure 3:
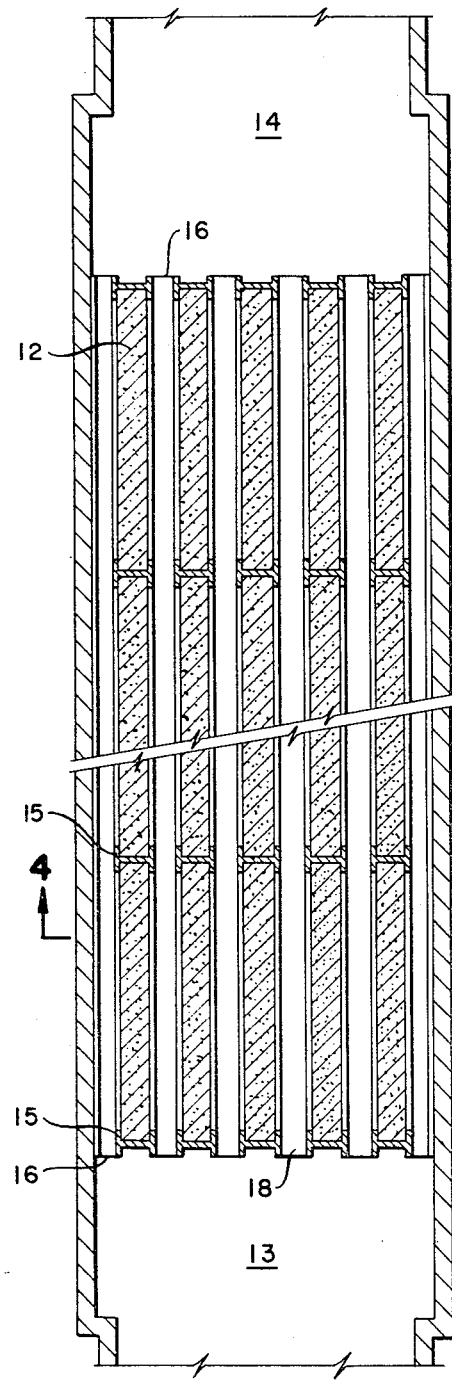
FIG. 3 is a cross section of an apparatus for the acceptance of $SO_3$.
Figure 4:
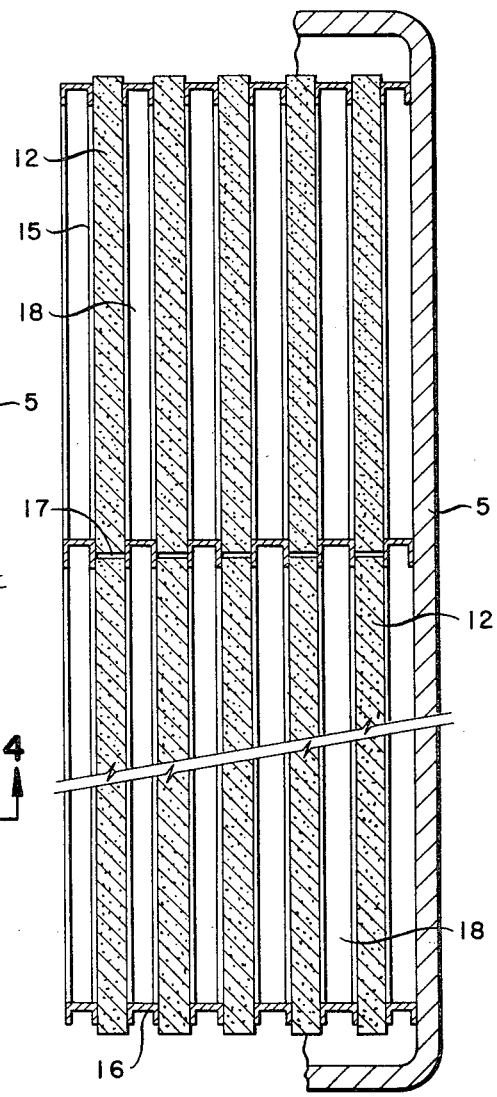
FIG. 4 is a cross section of the acceptance apparatus shown in FIG. 3 taken along line 4—4.

In this example sulfur oxides are removed from flue gas having the following composition:

74.5% by volume of $N_2$
13.6% by volume of $CO_2$
9.0% by volume of $H_2O$
2.7% by volume of $O_2$
0.2% by volume of $SO_2$
0.002% by volume of $SO_3$ and also contains soot and fly ash, as usual. The flue gas is oxidized at 430° C. by means of a $V_2O/K_2O/SiO_2$ oxidation catalyst of the same composition as stated in Example 1. To accomplish this it is passed with a GHSV of 5,000 Nl./liter of catalyst per hour through an oxidation apparatus such as shown in FIGS. 1 and 2. The flue gas leaving this apparatus is subsequently passed to the acceptance apparatus such as shown in FIGS. 3 and 4. In this apparatus $SO_3$ is accepted at 420° C.

When dimensions of approximately 7.5 m. long, 3 m. high and 3 m. wide are used in the oxidizing apparatus and approximately 9 m. long, 3 m. high and 3 m. wide in the accepting apparatus, the gamma-$Al_2O_3$ must be regenerated for 1 hour with 100% hydrogen sulfide about every 2 hours. The regeneration is carried out at the same temperature of approximately 420° C. The regeneration off-gas consisting of a mixture of sulfur dioxide, hydrogen sulfide and sulfur vapor is fed to a Claus plant.

To permit the continuous removal of sulfur oxides from the flue gas, use is made of two acceptance apparatuses which are alternately in the acceptance and the regeneration phase. These two apparatuses may be installed side by side in the flue gas channel, each provided with the requisite valved supply and valved discharge lines for the regeneration gas.

Example 3

Suitable acceptor plates for use in an apparatus as shown in FIGS. 3 and 4 can be obtained as follows:

Eighty parts by weight of gamma-alumina obtained by spray-drying and having a water content of 23% by weight and a particle size of approximately 70μ are placed in a furnace in which the temperature is uniformly raised from room temperature to 850° C. over a period of 200 minutes. The alumina is subsequently sintered for 3 hours at 850° C. The sintered alumina is cooled to room temperature outside the furnace and subsequently wetted with 250 parts by volume of water. To the wetted alumina are added, with stirring, 22 parts by weight of kaolin which is colloidally suspended in 22 parts by weight of water (particle size of the kaolin smaller than 2μ). The suspension of alumina in clay is filtered off and dried at 100° C. The dried mixture now contains approximately 71% of water, based on dry matter. This mixture is mixed with 10% by weight (based on dry matter) of a pore-forming agent, for which purpose polypropylene may be suitably used. After incorporation of the pore-forming agent, the total mixture is compressed in a manner known per se to form tiles of desired dimensions. The temperature of these tiles is then uniformly raised in a furnace from room temperature to 850° C. over a period of 200 minutes and subsequently baked at this temperature for 2 hours. The furnace temperature is then gradually lowered to room temperature over a period of 4 hours. The cooled tiles are suitable for immediate use.

Example 4

The mechanical stability of the gamma-alumina acceptors employed in the present process was determined in a test set-up which comprised an oxidation apparatus and an acceptance apparatus as well as a combustion furnace equipped with the requisite supply lines and connections for the introduction of air, nitrogen, sulfur dioxide and hydrogen sulfide. In this experiment 1.65 Nl./h. of $SO_2$ together with 10 Nl./h. $N_2$ and 93 Nl./h. of air were passed over an oxidation catalyst ($V_2O_5/K_2O/SiO_2$) at a temperature of 400° C.–450° C. thereby substantially completely oxidizing the sulfur dioxide to $SO_3$. The off-gas of the oxidation apparatus was diluted with 1000 Nl./h. of air and subsequently passed at 425° C. over the gamma-$Al_2O_3$ acceptor present in the acceptance apparatus. After dilution with air, the gas mixture contained 0.15% by volume of $SO_3$ with traces of $SO_2$. The GHSV used was 9,000 Nl. of gas mixture per liter of acceptor per hour (9,000 Nl./l.$^{-1}$ h.$^{-1}$).

The acceptance apparatus consisted of a quartz reactor with a length of 40 cm. and a diameter of 4 cm., which was filled with 100 ml. of gamma-$Al_2O_3$. The fixed bed had a height of 8 cm. and the rest of the reactor was occupied by pre-heating equipment.

The off-gas of the acceptance apparatus was analyzed for $SO_3$ and $SO_2$. No slip was found during a sustained acceptance time of 30 minutes. The loading of the acceptor after this period of 30 minutes was 5.4 g. of $SO_3$ per 100 g. of acceptor.

After acceptance, the test set-up was flushed with nitrogen to prevent errors in analysis.

The loaded gamma-$Al_2O_3$ acceptor was regenerated by means of 10 Nl./h. of $H_2S$ diluted with 10 Nl./h. of $N_2$. This gas mixture which contained hydrogen sulfide was passed directly over the acceptor at a temperature of 425° C. and a GHSV of 200 Nl. of gas mixture per liter of acceptor per hour. The regeneration off-gas, which contained water, sulfur and sulfur dioxide in addition to nitrogen, was diluted with 400 Nl./h. of air and burnt in the furnace at 600° C. In the combustion mixture the total amount of $SO_2$ formed was determined. It was found that the acceptor could be completely regenerated within 20 minutes.

After the regeneration the acceptance apparatus was flushed with air to remove any sulfur which might have condensed in the lines.

After 524 cycles consisting of acceptance plus regeneration, the test was terminated. At that time 22.5 g. of $SO_3$ per g. of acceptor had been removed. The acceptor bed was divided into an upper layer and a lower layer and the acceptor analyzed for crushing strength, pore volume and specific surface area. The results obtained are shown in Table III.

TABLE III

| Acceptor | Fresh | After 524 cycles | |
| --- | --- | --- | --- |
| | | Upper layer [1] | Lower layer |
| Crushing strength, kg./cm.² | 5.3 | 5.0 | 5.0 |
| Pore volume, ml./g. | 0.61 | 0.58 | 0.58 |
| Specific surface area, m.²/g. | 294 | 185 | 208.7 |

[1] $SO_3$ and $H_2S$ introduced into upper part of bed.

From the data shown it is evident that the acceptor is mechanically stable.

I claim as my invention:

1. A process for the removal of sulfur trioxide from industrial off-gases containing sulfur oxides which comprises:
   (A) contacting said off-gases at a temperature between 250° C. and 650° C. with a solid acceptor consisting essentially of an inorganic oxide which is substantially free of deposited metals or metal compounds said inorganic oxide being selected from the group consisting of activated alumina, magnesia, alumina, magnesia impregnated on an inert carrier and mixtures thereof, whereby sulfur trioxide is removed from said off-gases;
   (B) regenerating the resultant loaded acceptor by terminating contact with the off-gases and then contacting the loaded acceptor at a temperature between 200° C. and 550° C. with a gas containing at least 10% by volume hydrogen sulfide;
   (C) returning the regenerated acceptor into contact with said off-gases.

2. The process of claim 1 wherein the solid acceptor consists essentially of activated alumina, magnesia or mixtures thereof.

3. The process of claim 1 wherein the solid acceptor consists essentially of alumina or magnesia impregnated on an inert carrier.

4. The process of claim 2 wherein the gas employed for regenerating the loaded acceptors contains at least 25% by volume hydrogen sulfide.

5. The process of claim 4 wherein the off-gases are contacted with the solid acceptor at a temperature between 330° C. and 450° C. and at a gas hourly space velocity between 100 to 30,000 normal liters of gas per liter of acceptor per hour.

6. The process of claim 5 wherein the regeneration temperature differs not more than 50° C. from the acceptance temperature.

7. The process of claim 5 wherein the loaded acceptor is regenerated at a temperature between 280° and 475° C. and at a gas hourly space velocity of the hydrogen sulfide-containing gas of between 5 and 3,000 normal liters gas per liter of acceptor per hour.

8. The process of claim 1 wherein the solid acceptor is prepared by calcining alumina or hydrated alumina above 780° C., mixing the calcined material with a clay binding agent, compressing the mixture of acceptor material and clay binding agent under pressure into shaped plates or tiles and subsequently heating the shaped plates or tiles at a temperature above 780° C.

9. The process of claim 8 wherein the alumina or hydrated alumina is calcined at a temperature between 800 and 1100° C. and the shaped plates or tiles are heated at a temperature of from 800 to 1300° C.

10. The process of claim 9 wherein the binding agent is 0.1 to 0.5 parts by weight clay per part by weight alumina.

11. The process of claim 10 wherein the clay binding agent is partially replaced by finely divided glass in such an amount that the plates or tiles contain less than 10% by weight of glass based on dry matter.

12. The process of claim 10 wherein 1 to 25% by weight of a pore-forming agent is added to the mixture of acceptor material and binding agent.

13. The process of claim 1 wherein the sulfur compounds in the industrial off-gas are oxidized to sulfur trioxide with oxygen or an oxygen-containing gas in the presence of an oxidation catalyst prior to contacting with the solid acceptor.

14. The process of claim 13 wherein oxidation is carried out in the same temperature range as that used for acceptance.

15. The process of claim 14 wherein the industrial off-gas is flue gas or tail gas from a Claus plant.

References Cited
UNITED STATES PATENTS

| | | | |
| --- | --- | --- | --- |
| 2,747,968 | 5/1956 | Pigache | 423—244 |
| 3,563,704 | 2/1971 | Torrence | 423—244 X |
| 1,420,203 | 6/1922 | Macdowell et al. | 252—477 R |
| 2,061,848 | 11/1936 | Radcliffe | 252—477 R |
| 2,674,582 | 4/1954 | Darby | 252—477 R |
| 3,467,602 | 9/1969 | Koester | 252—477 R |
| 3,436,192 | 4/1969 | Karlsson | 423—244 X |

OSCAR R. VERTIZ, Primary Examiner

H. S. MILLER, Assistant Examiner

U.S. Cl. X.R.

252—477 R; 423—574